United States Patent [19]

Krueger et al.

[11] Patent Number: 4,607,199
[45] Date of Patent: Aug. 19, 1986

[54] COMPUTER CONTROLLED SAFETY SEAT SWITCH

[75] Inventors: William R. Krueger, West Allis, Wis.; Gerald N. McAuliffe, Lincoln, Nebr.; George A. Schlageter, Mequon, Wis.

[73] Assignee: Outboard Marine Corporation, Waukegan, Ill.

[21] Appl. No.: 648,146

[22] Filed: Sep. 7, 1984

[51] Int. Cl.⁴ .............................................. B60K 28/04
[52] U.S. Cl. .................................... 318/484; 318/139; 180/273; 364/424
[58] Field of Search ................... 364/424, 425, 431.09; 200/85 R, 85 A; 318/139, 484; 307/10 SB; 340/52 R, 52 E, 64, 901; 180/268, 272, 273, 270, 271

[56] References Cited

U.S. PATENT DOCUMENTS

| | | | |
|---|---|---|---|
| 3,500,946 | 3/1970 | Boyajian | 180/273 |
| 3,718,902 | 2/1973 | Pearsall | 340/52 E |
| 3,749,931 | 7/1973 | Rochat | 340/64 X |
| 3,838,748 | 10/1974 | Gray et al. | 180/273 |
| 3,930,555 | 1/1976 | Iijima | 307/10 SB X |
| 4,294,327 | 10/1981 | Howard | 180/273 |
| 4,366,366 | 12/1982 | Ekblad | 200/85 R X |

OTHER PUBLICATIONS

Ro, Bentsu, "Application of Fourier Transform Deconvolution Method...", Marquette University, 1983, pp. 154–155, Primary Examiner—Bernard Roskoski
Assistant Examiner—Bentsu Ro
Attorney, Agent, or Firm—Michael, Best & Friedrich

[57] ABSTRACT

A motor driven vehicle has a safety control preventing operation of the motor if the operator is not in the drivers seat to close a seat switch for a predetermined period of time. The motor includes an electric circuit which when complete enables motor operation and which prevents motor operation when the circuit is open. A microprocessor opens the circuit when the seat switch is open and is programmed to provide a predetermined time delay before opening the circuit to stop motor operation. The computer decrements the time delay whenever the seat switch is open. The computer includes means for testing to determine whether the time delay has been reduced to 0 at periodic intervals shorter than the predetermined time delay. The decremented time delay is restored to full value if the seat switch is closed during such testing before said time delay has been decremented to 0.

10 Claims, 4 Drawing Figures

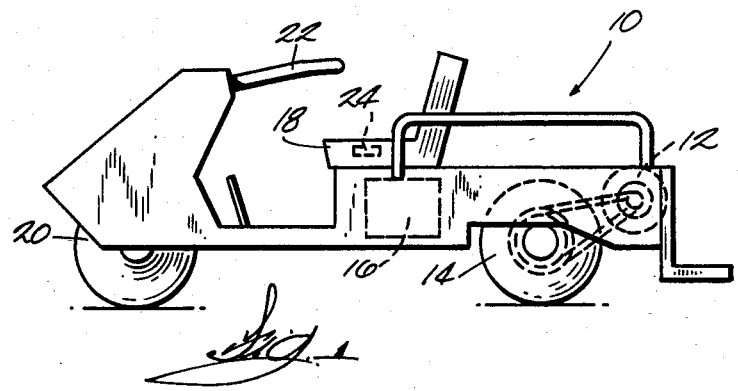
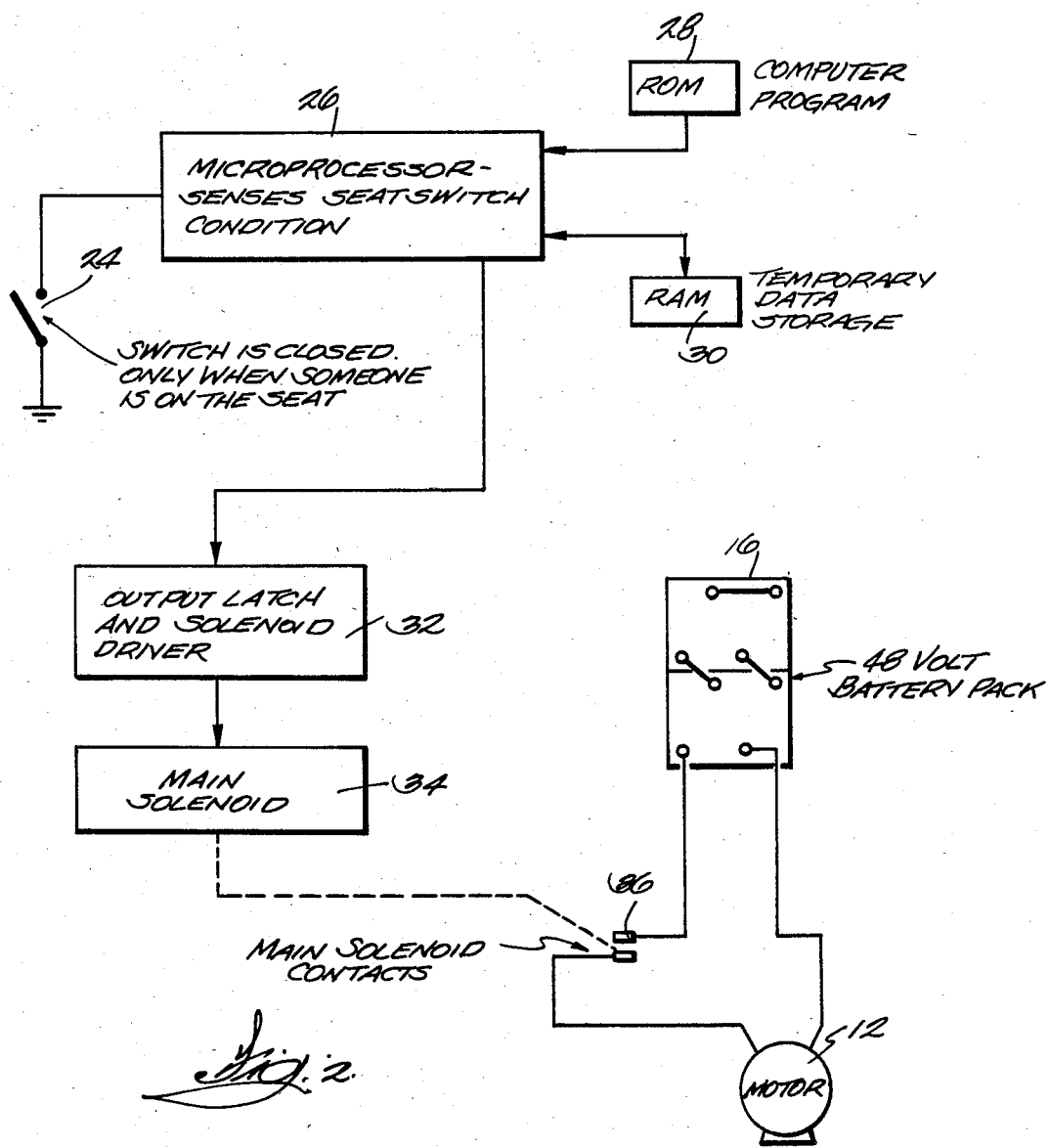

COMPUTER CONTROLLED SAFETY SEAT SWITCH

BACKGROUND OF THE INVENTION

Electric vehicles are customarily provided with a seat switch to verify that the driver is on the seat. If not, the vehicle cannot be operated. The driver may bounce off the seat momentarily so a time delay switch is employed. The time delay switch is costly.

As the cost of various chips etc. is reduced, it becomes feasible to have computer control of the function. If the compter control is associated with additional computer controlled functions, the cost becomes even more attractive.

SUMMARY OF THE INVENTION

A feature of this invention is to provide a motor driven vehicle having a safety control to disable operation of the motor if the operator is out of operating position for a given period of time. The vehicle has an electric circuit to enable or disable motor operation when the circuit is closed or open, and a seat switch which is actuated when the driver is in operating position and is open when the driver is out of position. A computer is operatively connected to the enabling circuit to provide a control signal to the circuit if the seat switch is disabled a given period of time. The computer is programmed to delay response to the switch being disabled for an initial time delay equal to said given period of time.

Another feature is to program the computer to decrease the time remaining in the time delay whenever the seat switch is open and to periodically check the status of the switch at intervals shorter than the initial time delay. The computer is programmed to restore the time delay to the initial time delay when the switch is closed when the status of the seat switch is tested.

Still another feature is to provide a motor driven vehicle having a control preventing operation of the motor unless the driver is in proper operating position as sensed by a switch closed in response to the driver being in proper operating position. A microprocessor senses the status of the switch and causes a circuit necessary for motor operation to be opened if the operator is not in proper position for a given period of time and has a time delay register which is decremented when the operator is out of position. The microprocessor periodically determines whether the operator is out of position during the time delay and also determines whether the time delay has been reduced to 0. The time delay register is increased to its original value if the operator resumes proper position before the time delay has been used up.

Another object is to provide a motor driven vehicle with a computer operated control for preventing motor operation unless the driver is in proper operating position or has been out of such position less than a predetermined time. The arrangement includes means operative to enable motor operation and actuatable to terminate motor operation. A switch is closed when the driver is in operating position and opens when the driver is out of position. A microprocessor having a timing register in which the predetermined time is stored is connected to monitor the status of the switch to decrement the timing register whenever the switch is open. The microprocessor is programmed to test the status of the switch and the timing register whenever the switch is open, and at intervals shorter than the predetermined time. The microprocessor causes actuation of the means to terminate motor operation if the timing register has been decremented to 0 and said switch is open. A further object is to increment the timing register to the full predetermined time if the switch is closed when the status is tested.

A further feature is the provision of a motor driven vehicle having a computer controlled safety device to disable vehicle operation if the driver seat is unoccupied a given period of time. A circuit enables operation of said motor when complete and disables operation when open. The seat switch is closed when the seat is occupied and a microprocessor senses closure of the seat switch and operative to cause said circuit to be opened after a given time delay. The time delay is reduced whenever the switch is open while the microprocessor periodically tests to determine the remaining period and whether the switch is open. Another feature is to provide the time delay which is increased to the original time delay if the switch is closed when the test is made.

This invention is not limited to the details of construction and the arrangement of components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

BRIEF DESCRIPTION OF THE DRAWINGS

FIG. 1 shows an electric vehicle.

FIG. 2 is a simplified block diagram showing the relationship of the batteries, the DC motor (which powers the electric vehicle in FIG. 1) and the control system and seat switch.

DETAILED DESCRIPTION OF THE DRAWINGS

Figure 3:
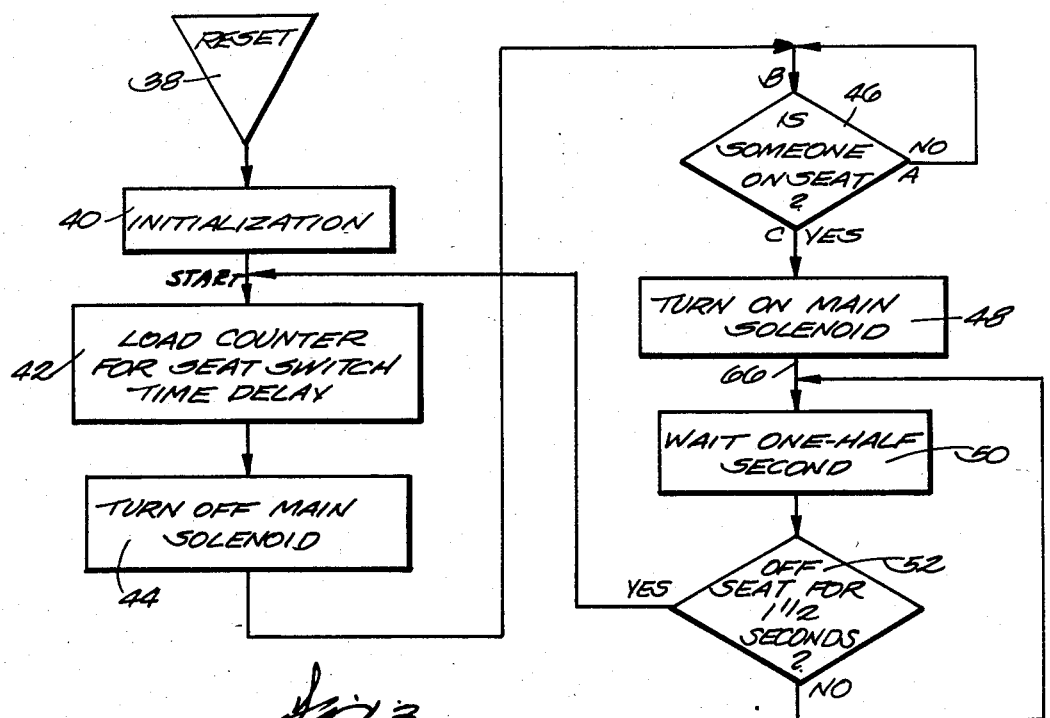
FIG. 3 is a simplified flow chart showing the operation of the seat switch control. This chart does not include many other functions which can be incorporated in a computerized control for an electric vehicle.

The electric vehicle 10 shown in FIG. 1 has a DC motor 12 driving the rear wheels 14. The motor is powered by a bank of batteries 16 with additional batteries being placed in circuit as the speed is increased. While the showing in FIG. 2 does not include means for progressively adding batteries to the motor circuit, such controls are common. The operator sits on seat 18 and steers the front wheel 20 by means of the tiller arrangement 22 or any other suitable arrangement. The seat 18 is provided with a switch 24 (FIG. 2) which is closed (actuated) when the driver sits on the seat. These seat switches provide safety in that the main battery circuit can't be connected to the motor unless the seat switch is closed. In the past, closure of the seat switch has energized a solenoid which closed the main contacts or motor switch means in the motor power supply. The present arrangement uses a very simple switch connected to the microprocessor 26 which has a read-only memory (ROM) chip 28 (INTEL 2716) connected thereto as well as a random-access memory (RAM) chip 30 (RCA CDP 1824 C). These chips and the computer 26 can be utilized for many more functions than described here.

The microprocessor 26 (an RCA CDP 1802 C) senses closure of the switch 24. The computer program has a register R2 (in the microprocessor 26) which establishes a given time delay which must be used up before actuating the shutdown of the power suppy to the DC motor. This time delay can be reprogrammed readily to provide any time delay thought appropriate. In the present instance let us assume that 1½ seconds is about right. This will allow for the operator to be off the seat due to bouncing and the like for up to 1½ seconds without the vehicle shutting down . If the driver is off the seat for more than 1½ seconds the vehicle will be shut down. Furthermore, it is desired that the vehicle not be started in the first place if the driver is not in the seat. If the seat switch is closed or has not been open for more than 1½ seconds, the microprocessor will instruct (send a control signal to) the output latch and solenoid driver 32 to actuate the main solenoid 34 to close (or keep closed) the main solenoid contacts (motor switch means) 36 and supply power to the DC motor.

FIG. 3 is a very simplified flow chart for the software associated with the microprocessor 26 and the associated RAM 30 and ROM 28. The flow chart leaves out many functions not relevant to the present consideration.

Starting from "start" or "reset" 38, the computer first initializes the control at 40. Initializing simply means that everything is put into an initial known starting state. Following that, the count register R2 in the computer 26 is loaded at 42 to provide for the seat switch time delay, in this case 1½ seconds. At 44 the program puts out a signal to turn off the main solenoid. At decision box 46 the logic looks at the seat switch 24 to see if anyone is on the seat. If no one is on the seat, the program exits at A and is returned to B and is in an endless loop until somebody occupies the seat which will release the program via C to turn on the main solenoid at 48 by energizing the output latch and solenoid driver 32 to pull in the solenoid 34 and close motor contacts 36.

The software provides for a ½ second delay at 50. This can be a simple computer controlled time delay or, in a system such as shown in co-pending application Ser. No. 648,147 this could be the time period in which a motor rpm count (speed) is established (determined). After the count for ½ second is established, it is stored in a register to be used in further control fuctions and the program progresses the decision box 52. In this simplified flow chart processing box 50 simply indicates the ½ second delay and for the present invention that is all that is of concern, namely there is some time delay before the logic is directed to decision box 52. In decision box 52, the simplified question to be answered is whether the driver has been off the seat for 1½ seconds. The logic looks to the R2 register to determine whether the time delay has been used up. If the driver has been off the seat for 1½ seconds R2 will be 0 and the logic exits at "yes" and returns to the flow chart ahead of the processing box 42. This means that the time delay register R2 will be reloaded at 42 and the main solenoid will be turned off at 44. If the driver has not been off the seat for 1½ seconds when the program enters decision box 52, the program exits at "no" and returns to the flow chart ahead of the ½ second delay at 50. As previously indicated, this is a very simplified explanation of this logic.

Figure 4:
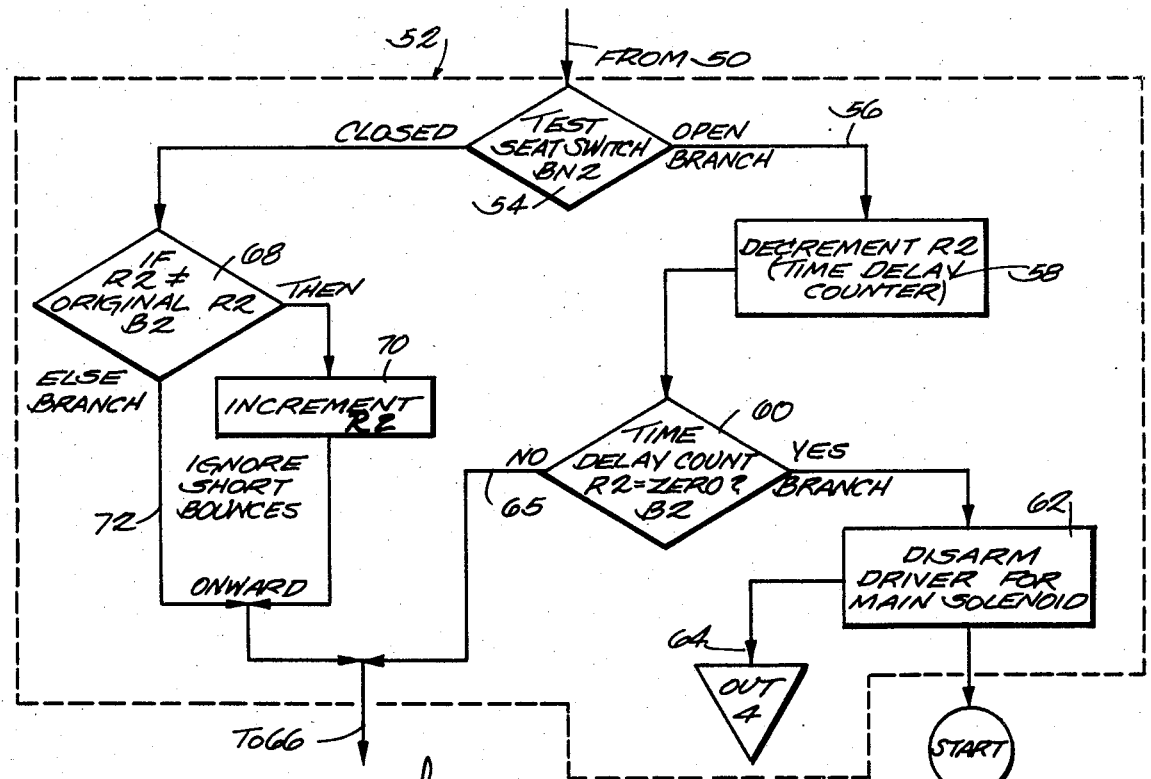
FIG. 4 is a more detailed flow chart of the decision box depicted at the bottom of FIG. 3.

What happens in decision box 52 is more completely shown in the flow chart of FIG. 4 in which the logic from the ½ second delay processing box 50 enters the decision box 52 (which is all of FIG. 4, for all practical purposes). The logic from 50 enters decision box 54 which tests the status of the seat switch. If the seat switch is open, the logic is directed through branch 56. The time delay register R2 will be decremented whenever the seat switch is open. In the processing box 58 the delay count is decremented by the accumulated time the operator has been off the seat. Now the logic proceeds to decision box 60 to determine whether the time delay count in R2 has been reduced to 0. If R2 has been reduced to 0, the program leaves box 60 via the "yes" branch and at processing box 62 directs the output 64 to open the main solenoid driver circuit. Thus, at the processing step 62 a signal is put out at 64 to open the main solenoid and the program goes from the processing box 62 back to "start" in FIG. 3.

If at decision box 60 it is determined that the time delay register R2 has not been reduced to 0, then the logic signal exits at the "no" branch 65 and returns to the flow chart shown in FIG. 3 at the junction 66 between decision boxes 48 and 50, thus, in effect, saying that another ½ second delay will occur before the program directs the logic into decision box 52.

If the test of the seat switch at decision box 54 (FIG. 4) shows the switch to be closed, the logic exits on the "closed" branch and enters decision box 68 which now determines if the remaining time delay in R2 is unequal to the original time delay (1.5 seconds). If it is unequal, the indication is that the operator has bounced off the seat for something less than 1½ seconds but everything is now okay since the operator is back on the seat. Therefore, with the remaining time and the original time delay being unequal, the logic exits box 58 on the "then" branch and enters the processing box 70 which increments the R2 count back to the original count (1.5 seconds). This wipes out further consideration of the short bounce of the driver off the seat. Having incremented the time delay register R2 to its original value, the logic signal leaves processing box 70 and goes to junction 66 to start another pass through the ½ second wait and then retest the system.

If at the decision box 54 (FIG. 4) it is determined that the switch is closed and at decision box 68 it is determined that the remaining time delay and the original time delay are the same, the logic exits decision box 68 at the "else" branch 72 to return to junction 66.

As previously indicated, with this arrangement if a longer or shorter time delay is desired, it is simply a matter of reprogramming the computer, which is easy. It will be appreciated the system determines if the operator is on the seat and whether the time delay has been decreased (by reason of a short bounce) so that full time delay can be restored (in the R2 register). If the operator is off the seat on the first pass through FIG. 4, the main solenoid will not be disarmed since at decision box 60 it will be determined the R2 count is not down to 0 and the logic will be directed out of the "no" branch. In effect the remaining time delay count now would be at say, 1 second. On the next pulse from the processing box 50 (½ second after the first test) the remaining time delay in R2 is checked. The remaining time delay can be down to 0.5 second and still nothing will happen. If the operator continues to be off the seat when the next pulse comes through, the time delay count will be down to 0 and the logic is directed from the decision box 60 on the "yes" branch to the processing box 62 to disarm the driver for the main solenoid. Thus, with the most adverse conditions, this sytem will shut down within 1½ seconds after the driver gets off the seat for whatever reason.

It will be appreciated this same concept can be applied to vehicles other than electric vehicles. In other words, this can be used to disable the ignition system in an internal combustion engine, etc. As a matter of fact, it need not be confined to land vehicles. It could be utilized in conjunction with boats, although in some of the very high speed boats, the operator does not sit on the seat because the ride is too rough. In those boats, the operator stands up and leans against a back rest to keep from flying side to side. There, instead of a seat switch you could have a "back" switch. That is, if the operator no longer leans against the back support, it is presumed he has gone overboard or fallen and the system should be shut down. It is appreciated that in many high speed motor boats, the operator has a lanyard connected between himself and an element in the ignition circuit so that the ignition system will be disabled if the operator is thrown overboard. The present arrangement could have some advantage over the lanyard arrangement in that it could simply shut down if the operator gets into the unsafe habit of not leaning against the back support. And, for those uses, the time delay period can be decreased by simple reprogramming. As used in the claims, "seat" is intended to embrace the back rest. As used in the claims, "vehicle" includes boats. Thus, the word is used in its dictionary sense of "any means in or by which someone travels or by which something is carried or conveyed."

The same functional result can be achieved by having the seat switch operation reserved, i.e., the switch can open when the driver is on the seat. Therefore, the claims refer to the switch having first and second positions and either position can be the closed position.

We claim:

1. A safety control for the motor of a motor driven vehicle of the type having a seat for an operator, which safety control disables the motor when the operator is off the seat for a given period of time, said safety control comprising circuit means for disabling motor operation in response to application of a control signal, a switch which is actuated to a first position when the operator is in the seat and which is actuated to a second position when the operator is off the seat, and a computer operatively connected to said circuit means, said computer including register means for storing a time delay having an initial value equal to the given period of time, test means for periodically ascertaining the position of said switch at intervals shorter than the given period of time, decrementing means for decreasing the time delay remaining in said register means whenever said switch is in said second position, restoring means for restoring the time delay remaining in said register means to the initial value if said switch is in said first position when the position of said switch is ascertained by said test means, and means for providing the control signal to said circuit means to disable operation of the motor when said decrementing means decrease the time delay from said initial value by an amount equal to the given period of time.

2. A safety control according to claim 1 in which said computer totals the time said switch is in said second position so long as said switch is in said second position each time the position of said switch is tested.

3. A safety control for the motor of a motor driven vehicle of the type having a seat for an operator, which safety control disables the motor when the operator is off the seat for a given period of time, said safety control comprising circuit means for disabling motor operation in response to application of a control signal, a switch which is actuated to a first position when the operator is in the seat and which is actuated to a second position when the operator is off the seat, and a computer operatively connected to said circuit means, said computer including test means for periodically ascertaining the position of said switch at intervals shorter than the given period of time, and means for applying the control signal to said circuit means to disable motor operation when the aggregate time said switch is in said second position equals the given period of time provided said switch is in said first position upon each successive test of the position of said switch.

4. In combination with a motor driven vehicle having a seat for the operator, control means preventing operation of the motor unless the operator is on said seat position, said control means including, a circuit enabling motor operation when closed and terminating motor operation when open, a switch actuated to a first position in response to the driver being on said seat, a microprocessor sensing the status of said switch and operative to cause said circuit to be opened if the operator is off said seat for a given period of time and having for such purpose a time delay register which is decremented when the operator off said seat, means for periodically determining whether the operator is off said seat during said time delay and for whether said time delay has been reduced to 0, and means operative to increase said time delay register to its original value if the operator returns to said seat before said time delay has been used up.

5. In combination with a motor driven vehicle having a seat for the driver, a computer operated control for preventing motor operation unless the driver is on the driver seat or has been off said seat less than a predetermined time, comprising, means operative to enable motor operation and actuatable to terminate motor operation, a switch which is actuated to a first position when the driver is on said seat and which is actuated to a second position when the driver is off said seat, and a microprocessor having a timing register in which said predetermined time is stored, said microprocessor being connected to monitor the status of said switch to decrement said timing register whenever said switch is in said second position, said microprocessor being programmed to test the status of said switch and said timing register whenever said switch is in said second position, said microprocessor being programmed to test the status of said switch and said timing register at intervals shorter than said predetermined time and being operative to cause actuation of said means to terminate motor operation if said register has been decremented to 0 and said switch is in said second position.

6. The combination of claim 5 in which said microprocessor is also programmed to increment said register to the full predetermined time if said switch is in said first position when the status is tested.

7. The combination of claim 6 in which said microprocessor is programmed to continue decrementing said register if said switch is in said second position and said register has not been reduced to 0 when the status is tested.

8. In combination with a motor driven vehicle having a seat for the driver, a computer controlled safety device to disable vehicle operation if said seat is unoccupied a given period of time, comprising, a circuit which enables operation of said motor when complete and disables operation when open, a seat switch which is actuated to a first position when said seat is occupied and actuated to a second position if the seat is unoccupied, computer means sensing said seat switch being in said first position and operative to cause said circuit to be opened, said computer means being programmed to provide a given time delay for said seat switch to be in said second position before opening said circuit, means reducing said time delay whenever said seat switch is in said second position, and test means operative to periodically determine the remaining period and whether said switch is open.

9. The combination of claim 8 in which the time delay is increased to said given time delay if said switch is in said first position when said test means operates.

10. A motor driven vehicle having a driver seat and a safety control to prevent operation of the motor if the operator is not in and has not been in said driver seat for a predetermined period of time, comprising, an electric circuit which when complete enables motor operation and which prevents motor operation when the circuit is open, a switch actuated to a first position by the operator being on said seat and actuated to a second position when the operator is not on said seat, computer means operative to open said circuit in response to said switch being in said second position and programmed to provide a predetermined time delay before opening said circuit to stop motor operation, said computer means including means to decrement said time delay whenever said switch is in said second position, said computer means including means for determining whether said time delay has been reduced to 0, means causing operation of said determining means periodically at intervals shorter than said predetermined time delay, and means for restoring the decremented time delay to full value if said switch is in said first position during operation of said determining means before said time delay has been decremented to 0.

* * * * *